United States Patent [19]
Hoyt

[11] Patent Number: 5,441,128
[45] Date of Patent: Aug. 15, 1995

[54] REFERENCE BRACKET MEANS FOR BRAKE STROKE LENGTH ADJUSTMENT GAUGE

[76] Inventor: Gordon C. Hoyt, P.O. Box 195, Little Hocking, Ohio 45742

[21] Appl. No.: 279,207

[22] Filed: Jul. 22, 1994

[51] Int. Cl.⁶ ............................................. F16D 66/02
[52] U.S. Cl. ................................. 188/1.11; 188/79.55
[58] Field of Search ................. 188/1.11, 79.51, 79.55, 188/79.56, 79.58, 79.61, 196 BA, 196 R, 196; 192/111 A, 111 R

[56] References Cited

U.S. PATENT DOCUMENTS

| | | | |
|---|---|---|---|
| 2,379,796 | 7/1945 | Freeman et al. | 188/79.55 |
| 3,356,188 | 12/1967 | Goldman et al. | 188/1.11 |
| 4,583,622 | 4/1986 | Ebbinghaus et al. | 188/79.55 |
| 5,044,302 | 9/1991 | Goldfein et al. | 188/1.11 W |
| 5,320,198 | 6/1994 | Hoyt et al. | 188/79.55 |

FOREIGN PATENT DOCUMENTS 3020365  10/1993  WIPO ........................... 188/1.11 W

Primary Examiner—Robert J. Oberleitner
Assistant Examiner—Chris Schwartz
Attorney, Agent, or Firm—Robert A. Spray

[57] ABSTRACT

A bracket body which is easily affixed to the brake rod and clevis member of conventional brake adjustment apparatus of air-actuated braking mechanism, provides indirect measurement of brake rod travel and adjustment, by the body showing the amount of angular rotation of the brake's adjuster member, even though brake rod travel is a generally linear stroke movement. The bracket body has a central body portion from which extends two extension members, a first one of the extension members being provided with attachment for the clevis and brake rod assembly, and the central body portion with attachment to the clevis pin. The second extension member provides the visual reference by relevance to the adjuster member.

16 Claims, 4 Drawing Sheets

REFERENCE BRACKET MEANS FOR BRAKE STROKE LENGTH ADJUSTMENT GAUGE

FIELD AND BACKGROUND OF THE INVENTION

The present invention relates to a brake apparatus that is air actuated, as used in large vehicles including, e.g., trucks, trailers, buses, tractors, and some larger recreational vehicles.

More particularly, the present invention relates to a novel and advantageous bracket body which is easily affixed to the brake rod and clevis member of conventional brake adjustment apparatus which is an integral part of the braking mechanism, as exists between the air chamber cylinder of the brake apparatus and the brake drum and the brake shoe whose forceful engagement achieves the desired stopping effect of the vehicle.

Even more particularly, the present invention provides such a reference bracket for the use in the brake apparatus shown in the previous U.S. Pat. No. 5,320,198, of which the present inventor was one of the joint inventors.

SUMMARY OF THE INVENTION AND ITS CONCEPTS

In carrying out the invention in a preferred form, the brake apparatus is provided with gauge means for indicating the linear stroke movement of a brake rod of a brake assembly, by observation of the angular rotation of the adjuster arm.

More particularly, the concepts provide that reference indicators are provided on both the brake-rod's yoke or clevis and on the brake's slack adjuster member. The reference indicators are cooperative, showing brake rod travel; and, together, they provide a stroke-length gauge of novel concept, even though the observation is made of the angular rotation of the adjuster member rather than directly measuring the linear movement of the brake rod.

Specifically as to the present invention, there is provided a reference bracket, economically from sheet metal or other commercially obtainable stock, and it is formed into a central body portion having two integral extensions.

A first one of the extensions is shaped generally as an ear attending perpendicularly to the plane of the central body portion; and this first extension member is formed with an open throat and a recess which can be snugly passed over the brake rod, held not only by a snug fit on the brake rod, but also economically held against the upstream end of the clevis by the same jam nut which the prior art uses to hold the selected spacing of the brake rod and the clevis member.

The central body portion of the bracket is provided with a hole of a size to snugly fit over the outer end of the clevis pin, preventing the translation of the bracket with reference to the assembly of clevis member and brake rod; and the hole is located far enough from the first extension member that the first extension member just passes the upstream end of the clevis when the central body portion hole is located onto the clevis pin end.

The second extension member may be generally coplanar with, and as an integral extension of, the central body portion; and, since the bracket is held stationery with respect to the assembly of clevis and brake rod, any movement of the brake rod, which of course causes a rotation of the adjuster arm by its connection to the clevis pin, provides a visual indication of the angular movement of the adjuster arm.

This angular movement of the adjuster arm, as noted above, achieves an indirect measurement of brake rod travel, similar to the operativity presented in these Inventors' prior patent but by significantly different components.

Special advantage is provided by the present invention by the fact that the bracket is not only easily manufactured as an original equipment item for a brake assembly of a new vehicle or new brake installation, but the invention avoids the need to replace or otherwise disturb the clevis member of all existing brake mechanisms which have an adjuster arm (as do most in use today), in order to achieve a clevis-carried indicator of the relative rotation of the adjuster arm.

In that patent (U.S. Pat. No. 5,320,198), one of the reference indicators was carried by the clevis member, suggested in the context as being forged as a component of the clevis member; and it is in lieu of that type of clevis-carried integral indicator that the present invention provides an advantageous "snap-on" reference body.

The background of the present invention thus can be considered to relate generally to the decades-long knowledge of the prior art, that air brakes inherently came out of adjustment, causing danger, all as detailed in the text of the Inventor's said prior patent; but it is with a brake installation involving a measurement of brake length travel (generally linearly), by observation of the angular rotation of the brake's adjuster arm, which is an indirect measurement as a procedure possible for many years prior to that patent, to which the present invention of a reference bracket provides the advantages achieved by the present invention.

That "indirect measurement" as a long-possible use of the inherent relation between the two movements (angular v. linear) is advantageously provided and facilitated by the "snap-on" bracket of the present invention.

More details are specified in the detailed description herein, and the advantages are then summarized.

BRIEF DESCRIPTION OF THE DRAWINGS

The above description of the novel and advantageous invention is of somewhat introductory and generalized form. More particular details, concepts, and features are set forth in the following and more detailed description of an illustrative embodiment, reference being had to the accompanying generally diagrammatic and schematic drawings, illustrating concepts, construction, and operational details, and in which:

FIGS. 3 and 4 are orthographic projections showing the bracket in elevation; and FIG. 5 is an isometric view of the bracket of FIGS. 1-4;

ABBREVIATED LISTING OF DESCRIPTIVE TERMS

Figure 1:
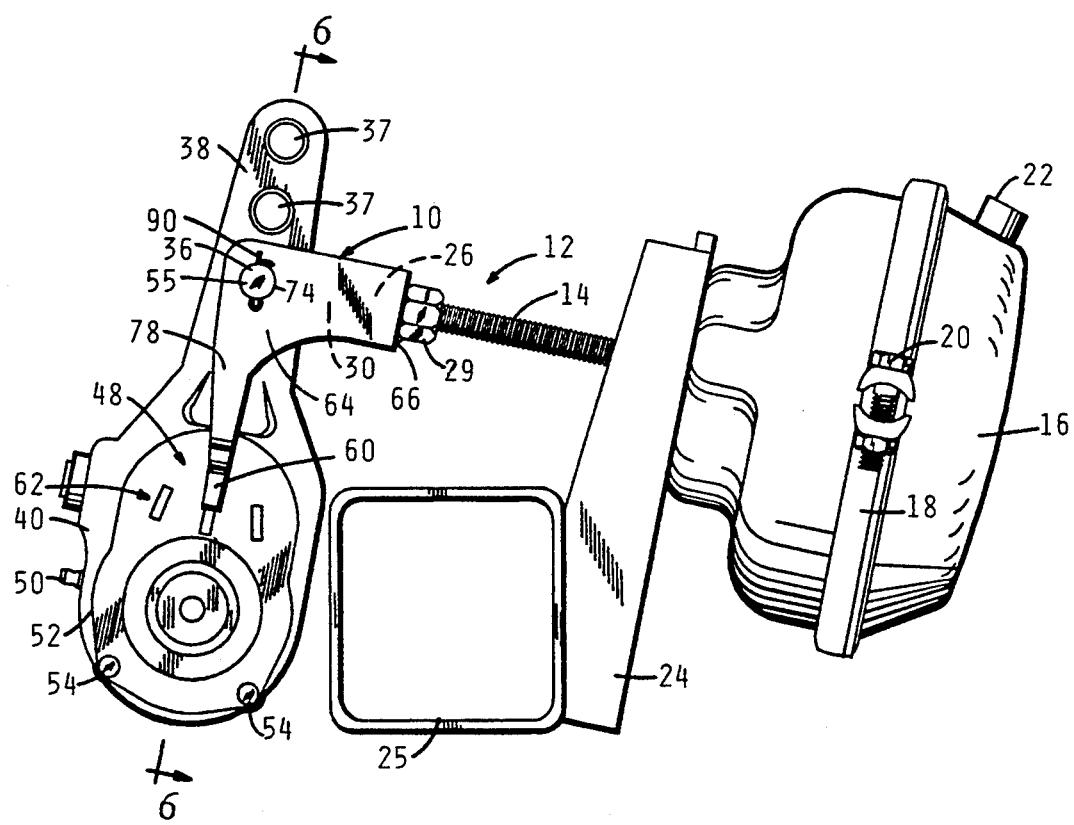
FIG. 1 is a side elevational view of a brake apparatus for a truck or other large vehicle, the assembly being provided with the brake adjustment-indicating means according to the present invention in a desired embodiment, and with a bracket according to the present invention mounted thereon, the brakes being shown in FIG. 1 in an adjustment of medium stroke length of brake adjustment.

10 The invention's reference bracket
14 brake rod
26 clevis
29 jam nut
30 clevis arms
36 clevis pin
38 adjuster arm
40 adjuster member
52 plate on 40
55 clevis pin end
60 1st reference indicator, on 78
62 2nd reference indicator, on 40
64 bracket's central portion
66 bracket's 1st extension ear
68/70 recess/throat of 66
74 hole in 64
78 bracket's 2nd extension
80 offset
90 cotter pin

DETAILED DESCRIPTION OF THE INVENTION AS SHOWN

The reference bracket means 10 for a brake installation 12 is illustrated in the Drawings, the present invention providing one of the reference indicia for the brake gauge as described below, and which, in their operative combination, provide an indication of setting and travel of the brake rod 14 of a vehicle's air brake apparatus 12.

The reference bracket means 10 more particularly is shown in its utilization with a conventional brake apparatus 12, and built upon reference indicia concepts of the above-cited U.S. Pat. No. 5,320,198.

In that patent, and in the brake apparatus 12 shown for the present invention, the components of the overall brake apparatus 12 are shown as now described somewhat schematically, as to both construction and operativity, mainly just to indicate the particulars of the present gauge reference indicia invention 10, and their related operativity and cooperativity with one another and with the components of the overall brake apparatus 12; for the conventional brake apparatus and its basic components are well known.

The description of the basic brake apparatus components thus begins (at the right in FIGS. 1 and 2) with the air chamber cylinder 16 from which the brake rod 14 extends, the air chamber cylinder 16 being fixedly mounted on the vehicle. The vehicle itself is not shown except as indicated by the vehicle components such as the chamber 16's supportive clamp assembly 18 and its bolt 20, the air inlet nipple 22, and the vehicle frame brackets 24 and 25, all as typical or conventional parts of air brake apparatus 12.

In such a brake installation 12, the transmission of braking force from the brake mechanism (not shown) of the vehicle moves the brake rod 14 outwardly of the air chamber cylinder 16 when the brake apparatus 12 is activated to impart pressure to the air chamber cylinder 16 and thus move the brake rod 14 (leftwardly as shown) against the bias of brake springs (not shown).

In the typical installation, the brake rod 14 of the brake apparatus 12 as shown also includes a clevis or yoke member 26, that being a forked member having a body part 28 which is screw-threadedly carried on the brake rod 14; and the clevis 26 is securely held to the brake rod 14 by a jam nut 29.

The clevis 26's body 28 has arms 30 (see FIGS. 7 and 8, and in cross-section in FIG. 6, although hidden in FIGS. 1 and 2) having aligned clevis openings 34 in the arms 30.

The clevis' arms 30 carry, by their openings 34, a horizontal and transversely-extending cylindrical clevis pin 36, the clevis pin 36 extending through a hole 37 which is in the upper end of the arm 38 of an adjuster member body 40, the arm 38 extending integrally from the body portion 40. Thus the arm 38 and the body 40 rotate as an integral unit in accordance with the linear movement of the clevis pin 36 to which the outer end of the arm 38 is rotatably pinned by passing through one of its holes 37.

Figure 2:
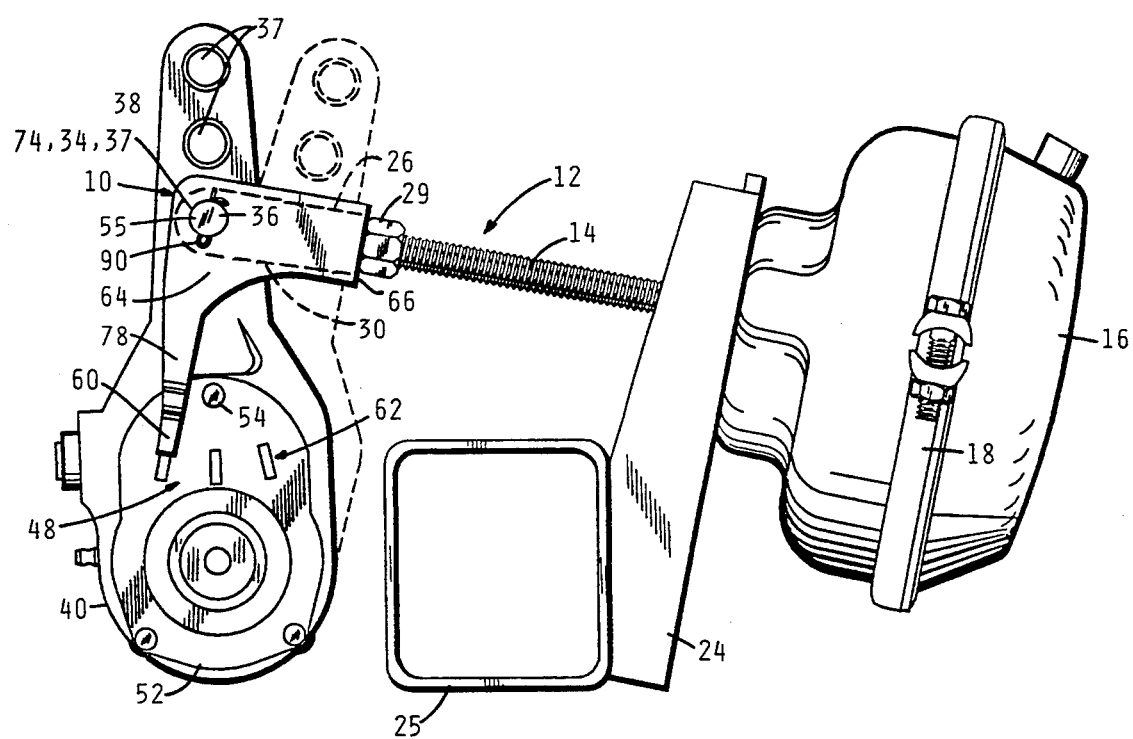
FIG. 2 shows the same assembly as in FIG. 1, except that in FIG. 2 the brake adjustment is shown, in full lines, as in a condition of maximum adjustment, and in broken lines showing a position of minimum stroke length adjustment, the view of FIG. 2 being of the same embodiment as that of FIG. 1 although the presence of the clevis member, hidden in both views, being shown in FIG. 2 in broken lines.
Figure 3:
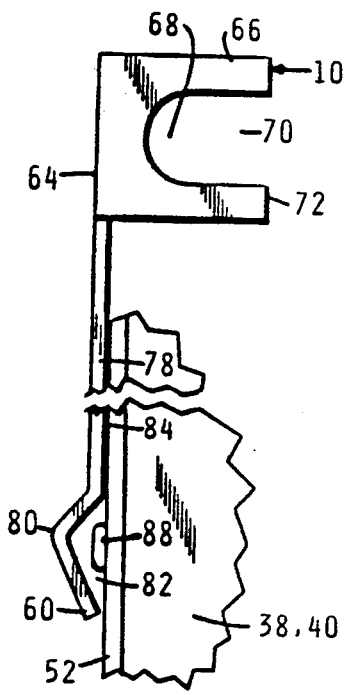
FIGS. 3-5 are views of the bracket shown in FIGS. 1 and 2 as providing the pointer reference indicia; and more particularly.
Figure 4:
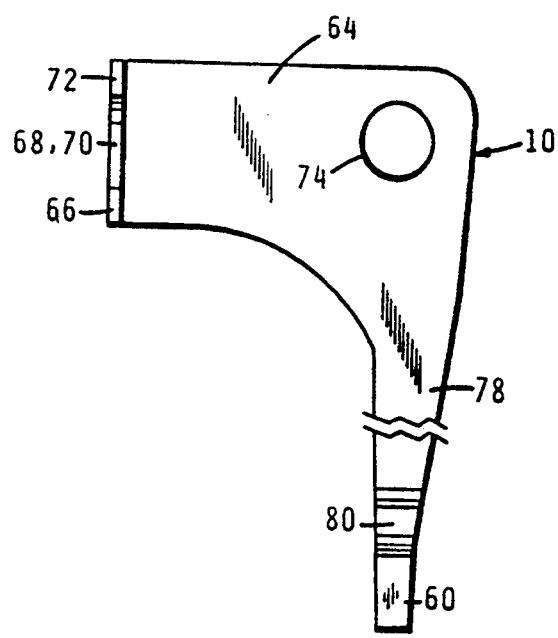
Figure 5:
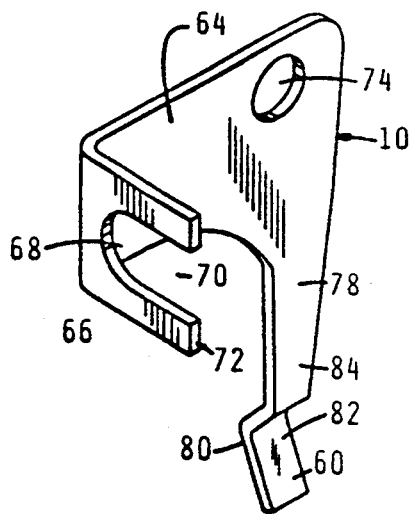
Figure 6:
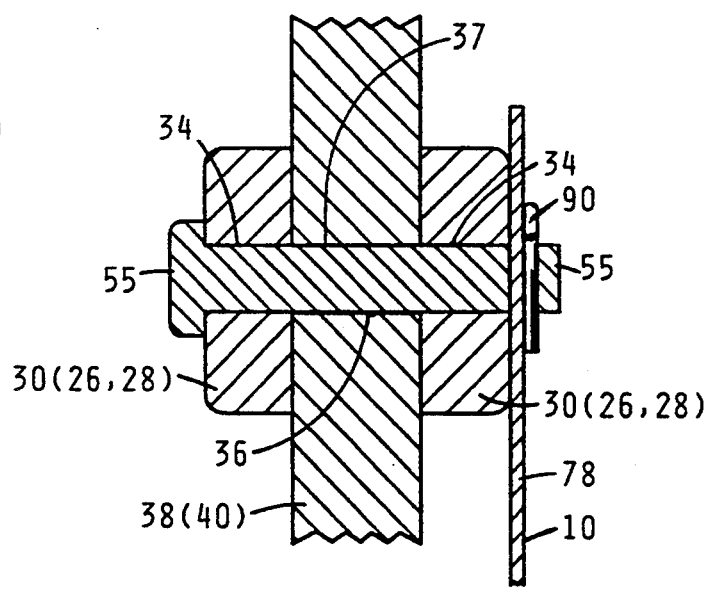
FIG. 6 is a fragmental detail view, in enlarged scale from that of FIGS. 1 and 2, of the assembly of the bracket, clevis, and the brake's adjuster arm, as indicated by Section-line 6—6 of FIG. 1.
Figures 7, 8:
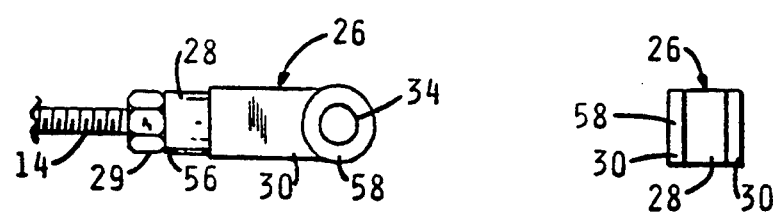
FIG. 7 is a fragmental elevation view illustrating the assembly of the brake rod and the clevis.
FIG. 8 is an end elevation view of the assembly shown in FIG. 7, viewed from the end thereof which has the clevis.

The adjuster member body 40, shown in FIGS. 1, 2, and 6, as having three optionally usable holes 37, is also called a "slack adjuster"; and it is in the linkage between the brake rod 14 and the vehicle's brake shoe means, and is used in adjusting the vehicle's brakes.

Continuing the description of the typical brake assembly installation, and as shown in this Inventor's said prior patent, the adjuster member body 40 mounts on a rod or shaft to transmit the brake force torque from the brake rod 14 and adjuster member 40 to the brake shoe mechanism.

In this Inventor's prior patent, and here, it is the effect of the brake actuation, acting through the clevis 26 and the clevis pin 36, which rotates the adjuster arm 38 and adjuster body 40 about the axis of the rod member or shaft just mentioned, that being a fixed axis of the apparatus, which is used to achieve a brake length gauge 48 effect, as shown below.

(The slack adjuster 40, except as noted below, may be, and here is, of conventional or typical form, and its typical other components are shown as a zerk grease fitting 50 and a cover plate 52 held by screws 54 to the body 40.)

Now as to the construction and concepts of the present invention, which provides the novel reference bracket means 10 for the gauge means 48 effect which shows brake adjustment setting and brake rod 14 travel.

The gauge 48, particularly as shown in FIGS. 1 and 2, comprises two sets of reference indicia, one of which per the present invention concepts is provided by the reference bracket means 10, achieving an indication of the brake rod length travel and adjustment, which is a substantially linear travel, by the angular change of the adjuster member 40.

It is important to note that the clevis member 26 and its arms 30 are fixedly carried on the brake rod 14, and thus are linearly movable therewith, and the clevis member's arms 30 are provided with retainer holes 34 which carry respective ends 55 of the clevis pin 36 and support the clevis pin 36 in a direction in which its axis is generally transverse to the axis of the brake rod 14 and the path of the movement of the brake rod 14 and clevis member 26 and its arms 30. This provides a pivotal connection, by the clevis pin 36, of the clevis member 26 (and its arms 30) to the arm 38 of the adjuster member body 40, the clevis member 26 and the adjuster member 40 being relatively rotatably movable due to their pivotal connection by the clevis pin 36.

As per the installation in this Inventor's prior patent, the clevis member 26 has a first portion 56 relatively adjacent the air chamber cylinder 16 and a second portion 58 relatively remote from the air chamber cylinder 16; and the clevis pin 36 is connected to the clevis member's second portion 58.

It may be considered that the clevis 26 (and its arms 30), the clevis pin 36, and the brake rod 14 are connected into an assembly, their components being relatively fixed with respect to the brake rod 14.

The gauge means 48 comprises visually indicative reference indicators, comprising a first visual reference indicator 60 which is carried by the assembly 14/26/36 and a second visual reference indicator 62 which is carried by the adjuster member 40 inwardly of its side edges.

That second reference indicator 62 is shown as comprising three reference indicia which are spaced apart to provide a calibration effect.

As with the Inventor's said prior patent, the first and second reference indicators are cooperative to visually show, by their relative movement, the linear stroke length of the brake rod 14, by visually showing relatively the linear travel of the clevis member 26 and the angular rotation of the adjuster member 40, an "indirect" measurement.

Differing, however, from the said prior patent with respect to the first reference indicator 60, here the first reference indicator 60 is provided by the novel reference bracket means 10.

As shown, the reference bracket means 10 comprises a central body portion 64 from which extends two extension members, a first one 66 of which extention members is provided with a recess 68 and a throat 70 opening to the recess 68 from an edge 72 of the first extension member 66.

Further as to the body member 10, the central body portion 64 of the reference bracket means 10 is shown provided with an opening 74 adapted to be received over the outer end 55 of the clevis pin 36.

As to the second extension member 78, as shown extends from the central body means 64 toward the axis of rotation of the adjuster member 40 and its arm 38, and provides the first visual reference indicator 60, quite differently from the small pointer member shown carried by the clevis arm of these Inventors' prior patent.

Providing a tight and fixed carry of the reference bracket means 10, it is shown as fixed to the clevis and brake rod assembly by the throat 70 and the recess 68 of the first extension member 66 being provided to be a snug fit on the brake rod 14, at a location on the brake rod 14 spaced from the clevis pin 36. This carry thus prevents rotation of the first extension member 66 about the axis of the clevis pin 36, thus also preventing any rotation of the central body portion 64 and the second extension member 78 about the axis of the clevis pin 36.

Moreover, the opening 74 in the central body portion 64 is provided to be a snug fit with respect to the clevis pin end 55 such as to prevent translation of the reference bracket means 10 with respect to the clevis/brake rod assembly. The walls of the opening 74 of the bracket 10, and the clevis pin end 55 which emerges outwardly of the outer yoke-arm 30, serve as cooperative abutment lug means in this respect.

In a desired form as shown, the reference bracket means 10 is provided from a single piece of sheet metal stock, and is formed to provide the first one 66 of the extension members and the central body portion 64 in substantially perpendicular planes.

It will be noted that the slack-adjuster member 40's second visual reference indicator 62's indicia is carried on a portion of the adjuster member 40 inwardly, i.e., inwardly with the respect to the axis of rotation of the adjuster member 40, of the adjuster member arm 38's connection to the clevis 26 and its clevis pin 36; and the second extension member 78 of the reference bracket means 10 extends along the adjuster member 40's arm 38 and into operative visual correspondency to the adjuster member's second visual reference indicator indicia 62. These details thus build upon the relationships concepts of the Inventor's prior patent, i.e., that of observing the relation of the bracket 10's reference indicia 60 and the adjuster member's reference indicia 62, achieving the gauge 48 effect indirectly.

In the form shown, the second extension member 78 of the reference bracket means 10 is provided with an offset 80 which provides a recess 82 opening to the face 84 of the second extension member 78 which is adjacent the adjuster member 40; and during brake actuation this recess 82 accommodates the second extension member 78 passing the location of whatever is a fastener member (here a head of screw 54) which is provided to secure an auxiliary plate 52 to the adjuster member 40, yet nevertheless permit the second extension member 78 to have a portion closely adjacent the second visual reference indicator 62 carried by the adjuster member 40, for facilitating visual gauge 48's effect of observation of the correspondency of the bracket 10's second extension member 78 and the second visual reference indicator indicia 62.

This invention of the reference bracket means 10 also takes advantage of the prior art's provision of the nut member 29 which is threaded onto the brake rod 14 and serves as a jam nut 29 holding the clevis 26 and the brake rod 14 at a selected relative spacing. This advantage is achieved by locating the first extension member 66 relative to the hole 74 such that the first extension member 66 is provided to be held to the clevis and brake rod assembly 14/26 by being received on the brake rod 14 at a location engaging the end 56 of the clevis 26 which is most adjacent the air chamber cylinder 16, and is held firmly against the clevis end 56 by the nut member 29. The same nut member 29 thus serves both of those holding functions.

The invention also builds upon the prior art with respect to the retention which the prior art provides for the clevis pin 36, i.e., an axial retention means such as the cotter pin 90 shown for retaining the clevis pin 36 axially of the holes 34 in the clevis arms 30, and holes 37 in the adjuster member arm 38.

More particularly as to this building on the prior art retention by pin 90, the central body portion 64 of the reference bracket means 10 in the region of the bracket hole 74 is of small thickness, which provides that the bracket 10's hole 74 may be fitted over the adjacent clevis pin end 55 far enough that the central body portion 64 of the bracket means 10 will be held to the adjacent clevis arm 30 axially inwardly of the clevis pin end 55 by the same retention means, here the cotter pin 90 in the clevis pin end 55, which retains the clevis pin 36 itself.

MISCELLANEOUS CONSIDERATIONS

The words "indicia" and its synonym "indicant," as meaning an indicator thing or a mark for a distinct purpose, are found in some but not all dictionaries, but are used here to designate components which have an indicator function when compared visually, as described above; and the indicia 62 are spaced to show discrete markings, when compared to the location of the designator 60 of the bracket 10 (78) to indicate the stroke length or brake rod travel and setting indirectly as described.

Desirably, the plurality of indicia 62 are provided to show minimum and maximum settings, which satisfy the manufacturers' and/or the legal requirements, such as DOT and NHTSA. Moreover as shown, one of the plurality of indicias 62 is in the center position, indicating how far the brake rod 14 would need to move to be either over or under adjustment, and indicating how much adjustment movement is left before exceeding those requirements.

The indicia 62 of the second reference indicator 60 are desirably provided by integral formations of the adjuster member body 40, as by providing them as upraised rib-like bulges or protrusions, or by providing a recess in the surface of the body 40 and filling the recess with a substance providing high visibility, and having a high dirt and grease resistance, all providing ease and convenience in setting and inspecting the setting and brake rod 14 travel.

Desirably, the individual indicia 62 are surfaced with different colors.

The use of the gauge 48, it being always present to automatically provide and show brake rod setting and travel, is very easy and reliable especially with the reference bracket 10 installed onto the vehicle. As it passes the indicia 62 of the set of indicia 62 on the adjuster body 40, the pointer 56 will show conditions of brake stroke as to being over, under, or correct as to adjustment, all generally as per the Inventors said prior patent, but facilitated by the use of the bracket 10 of the present invention.

SUMMARY OF COMPONENTS AND OPERATIONAL DETAILS, AND THEIR ADVANTAGES

The present invention as detailed herein has advantages in both concept and in component parts and features; for in contrast to other equipment known to the inventor, the invention provides advantageous features which should be considered, both as to their individual benefit, and to whatever may be considered to be also their synergistic benefit toward the invention as a whole, and as building upon, and being consistent with or carrying forward the features of the inventor's cited prior patent. Summarizing these details of components and effects:

(a) The relatively movable indicator units are inherently accurately located;

(b) The invention lends itself to use with installations with or without automatic slack adjusters;

(c) No measuring, and no subtraction, need be done to get close determination of stroke length and brake adjustment;

(d) Access is as easy or easier than with other apparatus for determination of stroke length;

(e) The reference bracket may be provided as original equipment or used with a brake rod assembly of clevis and adjuster member of most all existing brake assemblies;

(f) Advantage is taken of the same several geometric factors of the brake equipment itself, and the kinematic relation of its components, as gauging, indirectly, per the Inventor's said prior patent, i.e., the pinned connection of the brake rod's yoke or clevis to the adjuster arm, the rotation of the adjuster arm about a fixed center spaced from the arm's connection to the yoke or clevis, and the rotation of the adjuster arm being a function of the length of brake rod stroke, thus achieving a determination of the lineal stroke length by merely an observation of the amount of rotation of the adjuster arm, as that arm-rotation is indicated by lineal movement of the yoke clevis' reference detail's movement with respect to rotation of the adjuster arm;

(g) Very economical manufacturing;

(h) Non-likelihood of parts becoming loose or inaccurate;

(i) Easy to maintain;

(j) The reference indicia may be in a plurality, to show minimum and maximum settings that satisfy the manufacturer's and/or legal requirements;

(k) An indicia marking desirably is in the center position as well as the extreme movement markings, to indicate how far the brake rod would need to move to be either over or under adjustment; and this feature not only indicates if the brakes were over or under DOT or NHTSA and manufacturer's stroke ranges for air chambers/rod mechanisms, but also will indicate how much movement is left before exceeding these requirements;

(l) Indicator marks on the main body may be made extremely visible by casting below the main body surface and filling in with a bright, light-reflective polymer or some other dirt and grease resistance material;

(m) The pointer on the bracket may also be brightly colored with a light-reflective, grease and dirt resistant material, which would allow a simple visual check of brake adjustment at night by use of a common flashlight without crawling under the vehicle;

(n) The overall advantages encourage the proper and frequent adjustment of the brakes of all the brake units of the vehicle, thus avoiding irregularity of braking effect and thus avoiding the difficulty of vehicle control; and (o) The invention takes advantage of prior art of brackets, particularly those of an easy-attach or "snap-on" nature, economically of sheet metal or other economical formation, but provides for a bracket integral extensions which integrally provide at least three features of holding, positioning, and observing, all with relation to the installation components with which the bracket is used.

CONCLUSION

It is thus seen that a reference bracket device for a brake apparatus, constructed and used according to the inventive concepts herein set forth, provides novel concepts of an economical, desirable and usefully advantageous device, yielding advantages which are and provide special and particular advantages when used as herein set forth, as either for new equipment or applicable by easy installation to existing vehicles.

Modifications and variations may be effected without departing from the scope of the novel concepts of the invention; accordingly, the invention is not limited to the specific embodiment or form or arrangement of parts herein described or shown.

I claim:

1. A reference bracket means for a visually indicative stroke length gauge means for visually indicating travel of a brake rod of an air brake apparatus of a vehicle, said air brake apparatus including a brake rod and an air chamber cylinder from which cylinder the brake rod extends;

the apparatus being such that the brake rod moves substantially linearly outwardly of the air chamber cylinder in response to activation of the brake apparatus;

the air brake apparatus also including a clevis member having a clevis pin, and a rotatable adjuster member having a rotatable adjuster member body having a rotatable arm and a connection of the adjuster member body and the arm;

the clevis member being fixedly carried on the brake rod, and linearly movable therewith;

and the clevis member is provided with retainer holes which carry respective ends of the clevis pin and support it in a direction in which its axis is generally transverse to the axis of the brake rod and the path of the movement of the brake rod and clevis member;

and there being a pivotal connection, by the clevis pin, of the clevis member to the arm of the adjuster member body, and the clevis member and the adjuster member being relatively rotatably movable due to their pivotal connection by the clevis pin;

the clevis member having a first portion relatively adjacent the air chamber cylinder and a second portion relatively remote from the air chamber cylinder, the clevis pin being connected to the clevis member's second portion;

the clevis, clevis pin, and brake rod being connected into an assembly whose components are relatively fixed with respect to the brake rod;

the gauge means comprising visually indicative reference indicators comprising a first visual reference indicator which is carried by the said assembly and a second visual reference indicator which is carried by the adjuster member inwardly of the side edges thereof;

the first and second reference indicators being cooperative to visually show, by their relative movement, the linear stroke length of the brake rod, by visually showing relatively the linear travel of the clevis member and the angular rotation of the adjuster member;

in which the reference bracket means comprises a central body portion from which extends two extension members, a first one of said two extension members is provided with a recess and a throat opening to the recess from an edge of said first extension member;

and the central body portion of the reference bracket means is provided with an opening adapted to be received over an end of the clevis pin;

and the second extension member from the central body means extends toward the axis of rotation of the adjuster member and its arm, and provides the first visual reference indicator;

the throat and the recess of said first extension member being provided to be received onto the clevis and brake rod assembly at a location thereon spaced from the clevis pin, and providing a snug fit thereon such as to prevent rotation of the reference bracket means about the axis of the clevis pin;

and the opening in the central body portion is provided to be a snug fit with respect to the clevis pin such as to prevent translation of the reference bracket means with respect to the said assembly.

2. A reference bracket means as set forth in claim 1, in which the reference bracket means is provided from a single piece of sheet metal formed to provide the first of the extension members and the central body portion in substantially perpendicular planes.

3. A reference bracket means as set forth in claim 1, in which the reference bracket means is provided from a single piece of stock formed to provide the first of the extension members and the central body portion in substantially perpendicular planes.

4. A reference bracket means as set forth in claim 1, in which the second visual reference indicator is carried on a portion of the adjuster member inwardly, with respect to the axis of rotation of the adjuster member, of the adjuster member arm's connection to the clevis;

and the second extension member of the reference bracket means extends along the adjuster member's arm and into operative visual correspondency to the second visual reference indicator.

5. A reference bracket means as set forth in claim 4, in which an auxiliary plate is secured to the adjuster member by a fastener which extends from the adjuster member, through the auxiliary plate, and into the path of rotation of the second extension member, in which the second extension member of the reference bracket means is provided with an offset which provides a recess opening to the face of the second extension member which is adjacent the adjuster member, accommodative, during brake actuation, of the second extension member passing the location of the said fastener, but also permitting the second extension member to carry the first visual reference indicator closely adjacent the second visual reference indicator carried by the adjuster member, for facilitating visual observation of the correspondency of the first visual reference indicator, provided by the second extension member, and the second visual reference indicator, carried by the adjuster member.

6. A reference bracket means as set forth in claim 1, in which the throat and the recess of said first extension member are provided to be received onto the brake rod.

7. A reference bracket means as set forth in claim 1, a nut member being threaded onto the brake rod and serving as a jam nut holding the clevis and the brake rod at a selected relative spacing, in which the first extension member is provided to be held to the clevis and brake rod assembly by being received on the brake rod at a location engaging the end of the clevis which is most adjacent the air chamber cylinder, and is held firmly against the said clevis end by the nut member, the same nut member serving both holding functions.

8. The reference bracket means as set forth in claim 1, there being provided for the clevis pin an axial retention means retaining the clevis pin axially of the holes in the clevis arms and the adjustment member, in which the central body portion of the reference bracket means, in the region of the hole through which the clevis pin end extends, is of small thickness, providing that the bracket means' central body portion's hole may be fitted over the adjacent clevis pin end far enough that the central body portion of the bracket means will be held to the clevis pin axially inwardly of the clevis pin end by the same retention means which retains the clevis pin itself.

9. A reference bracket means for a visually indicative stroke length gauge means for visually indicating travel of a brake rod of an air brake apparatus of a vehicle, said air brake apparatus including a brake rod and an air chamber cylinder from which cylinder the brake rod extends;

the apparatus being such that the brake rod moves substantially linearly outwardly of the air chamber cylinder in response to activation of the brake apparatus;

the air brake apparatus also including a clevis member having a clevis pin, and a rotatable adjuster member having a rotatable adjuster member body having a rotatable arm and a connection of the adjuster member body and the arm;

the clevis member being fixedly carried on the brake rod, and linearly movable therewith;

and the clevis member is provided with retainer holes which carry respective ends of the clevis pin and support it in a direction in which its axis is generally transverse to the axis of the brake rod and the path of the movement of the brake rod and clevis member;

and there being a pivotal connection, by the clevis pin, of the clevis member to the arm of the adjuster member body, and the clevis member and the adjuster member being relatively rotatably movable due to their pivotal connection by the clevis pin;

the clevis member having a first portion relatively adjacent the air chamber cylinder and a second portion relatively remote from the air chamber cylinder, the clevis pin being connected to the clevis member's second portion;

the clevis, clevis pin, and brake rod being connected into an assembly whose components are relatively fixed with respect to the brake rod;

the gauge means comprising visually indicative reference indicators comprising a first visual reference indicator which is carried by the said assembly and a second visual reference indicator which is carried by the adjuster member inwardly of the side edges thereof;

the first and second reference indicators being cooperative to visually show, by their relative movement, the linear stroke length of the brake rod, by visually showing relatively the linear travel of the clevis member and the angular rotation of the adjuster member;

in which the reference bracket means comprises a central body portion from which extends two extension members, a first one of said two extension members is provided with a recess and a throat opening to the recess from an edge of said first extension member;

there being an abutment lug means carried by the clevis;

and the central body portion of the reference bracket means is provided with an abutment lug means cooperative with the clevis' abutment lug means;

and the second extension member from the central body means extends toward the axis of rotation of the adjuster member and its arm, and provides the first visual reference indicator;

the throat and the recess of the said first extension member being provided to be received onto the clevis and brake rod assembly at a location thereon spaced from the clevis pin, and providing a snug fit thereon such as to prevent rotation of the reference bracket means about the axis of the two abutment lug means;

and the cooperation between the abutment lug means of the central body portion and the abutment lug means of the clevis is such as to prevent translation of the reference bracket means with respect to the said assembly.

10. A reference bracket means as set forth in claim 9, in which the reference bracket means is provided from a single piece of sheet metal formed to provide the first of the extension members and the central body portion in substantially perpendicular planes.

11. A reference bracket means as set forth in claim 9, in which the reference bracket means is provided from a single piece of stock formed to provide the first of the extension members and the central body portion in substantially perpendicular planes.

12. A reference bracket means as set forth in claim 9, in which the second visual reference indicator is carried on a portion of the adjuster member inwardly, with respect to the axis of rotation of the adjuster member, of the adjuster member arm's connection to the clevis;

and the second extension member of the reference bracket means extends along the adjuster member's arm and into operative visual correspondency to the second visual reference indicator.

13. A reference bracket means as set forth in claim 12, in which an auxiliary plate is secured to the adjuster member by a fastener which extends from the adjuster member, through the auxiliary plate, and into the path of rotation of the second extension member, in which the second extension member of the reference bracket means is provided with an offset which provides a recess opening to the face of the second extension member which is adjacent the adjuster member, accommodative, during brake actuation, of the second extension member passing the location of the said fastener, but also permitting the second extension member to carry the first visual reference indicator closely adjacent the second visual reference indicator carried by the adjuster member, for facilitating visual observation of the correspondency of the first visual reference indicator, provided by the second extension member, and the second visual reference indicator, carried by the adjuster member.

14. A reference bracket means as set forth in claim 9, in which the throat and the recess of said first extension member are provided to be received onto the brake rod.

15. A reference bracket means as set forth in claim 9, a nut member being threaded onto the brake rod and serving as a jam nut holding the clevis and the brake rod at a selected relative spacing, in which the first extension member is provided to be held to the clevis and brake rod assembly by being received on the brake rod at a location engaging the end of the clevis which is most adjacent the air chamber cylinder, and is held firmly against the said clevis end by the nut member, the same nut member serving both holding functions.

16. A reference bracket means as set forth in claim 9, in which the abutment lug means carried by the clevis is an end portion of the clevis pin, and the abutment lug means provided by the reference bracket means is the wall of a hole provided in the central body portion of the reference bracket means.

* * * * *

UNITED STATES PATENT AND TRADEMARK OFFICE
CERTIFICATE OF CORRECTION

PATENT NO. : 5,441,128
DATED : Aug. 15, 1995
INVENTOR(S) : Gordon C. Hoyt

It is certified that error appears in the above-indentified patent and that said Letters Patent is hereby corrected as shown below:

Col. 1, line 47:   The word "attending" should be "extending".

Col. 7, line 49:   "Inventors" should be "Inventor's".

Col. 9, line 16:   "I claim:" should be "CLAIMS".

Signed and Sealed this

Fourteenth Day of November, 1995

Attest:

BRUCE LEHMAN

Attesting Officer      Commissioner of Patents and Trademarks